(12) United States Patent
Itano

(10) Patent No.: US 8,289,431 B2
(45) Date of Patent: Oct. 16, 2012

(54) IMAGE SENSING DEVICE AND IMAGE SENSING SYSTEM

(75) Inventor: Tetsuya Itano, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 620 days.

(21) Appl. No.: 12/470,580

(22) Filed: May 22, 2009

(65) Prior Publication Data

US 2009/0303340 A1  Dec. 10, 2009

(30) Foreign Application Priority Data

Jun. 5, 2008  (JP) .................................. 2008-148326

(51) Int. Cl.
*H04N 3/14* (2006.01)
*H04N 5/335* (2011.01)
*H01L 27/00* (2006.01)

(52) U.S. Cl. ...................... 348/308; 348/294; 250/208.1

(58) Field of Classification Search .................. 348/294, 348/302, 308–310; 250/208.1
See application file for complete search history.

(56) References Cited

U.S. PATENT DOCUMENTS

| 7,321,110 B2 | 1/2008 | Okita et al. ................. 250/208.1 |
| 7,460,162 B2 | 12/2008 | Koizumi et al. .............. 348/294 |
| 7,462,810 B2 | 12/2008 | Kobayashi et al. ......... 250/208.1 |
| 7,550,793 B2 | 6/2009 | Itano et al. ..................... 257/239 |
| 8,023,027 B2 * | 9/2011 | Yamamoto ..................... 348/308 |
| 2006/0109362 A1 | 5/2006 | Kim et al. ...................... 348/308 |
| 2007/0052831 A1 | 3/2007 | Ogura et al. .................. 348/308 |
| 2008/0036891 A1 | 2/2008 | Ono et al. ..................... 348/308 |
| 2008/0158403 A1 | 7/2008 | Itano et al. .................... 348/308 |
| 2009/0015699 A1 | 1/2009 | Watanabe et al. ............. 348/308 |
| 2009/0122172 A1 | 5/2009 | Iwata et al. ................... 348/302 |
| 2009/0167914 A1 | 7/2009 | Itano et al. .................... 348/301 |
| 2009/0200449 A1 | 8/2009 | Iwata et al. ................... 250/206 |
| 2009/0219424 A1 | 9/2009 | Sonoda et al. ................ 348/302 |

FOREIGN PATENT DOCUMENTS

| JP | 2000-287219 A | 10/2000 |
| JP | 2006-128704 A | 5/2006 |

* cited by examiner

*Primary Examiner* — Alicia M Harrington
(74) *Attorney, Agent, or Firm* — Fitzpatrick, Cella, Harper & Scinto

(57) ABSTRACT

An image sensing device including a pixel array having a plurality of pixels which form rows and columns. Each pixel is connected to one of a plurality of column signal lines. The image sensing device also includes a plurality of readout units that read out signals from the pixel array via the plurality of column signal lines, each of the plurality of readout units including an input transistor that receives a signal on the column signal line, a first load transistor that supplies an electric current to the input transistor, and a plurality of bias supply units that supply bias voltages to gates of the first load transistors of the plurality of readout units. The first load transistors of the readout units, which are arranged adjacent to each other, are each connected to different bias supply units.

6 Claims, 9 Drawing Sheets

IMAGE SENSING DEVICE AND IMAGE SENSING SYSTEM

BACKGROUND OF THE INVENTION

1. Field of the Invention

The present invention relates to image sensing devices and image sensing systems.

2. Description of the Related Art

An image sensing device comprises a pixel array in which a plurality of pixels are arrayed in a direction along rows and a direction along columns. A line noise which extends in a horizontal direction (hereinafter referred to as "horizontal line noise") sometimes occurs in images captured by image sensing devices.

Specifically, horizontal line noise sometimes occurs due to a generation mechanism shown in Japanese Patent Laid-Open No. 2006-128704. As shown in FIG. 2 of Japanese Patent Laid-Open No. 2006-128704, parasitic overlap capacitances CP(0) to CP(m) are formed between gates of load transistors ML(0) to ML(m) and column analog buses Bus(0) to Bus(m). When a data voltage is read out after a reset voltage has been read out from the pixels to the column analog buses Bus(0) to Bus(m) to carry out CDS processing, the voltages of the column analog buses Bus(0) to Bus(m) change from the reset voltage to the data voltage. This change in voltage affects the bias voltages via the overlap capacitances CP(0) to CP(m). The bias voltages are transmitted from an active transistor MF to the load transistors ML(0) to ML(m). In this way, the gate voltages of the load transistors ML(0) to ML(m) fluctuate, and therefore the electric currents that flow in the column analog buses Bus(0) to Bus(m) also fluctuate. Due to this fluctuation in bias voltages, proper values are not achieved for image signals, which are a difference between the reset voltages and the data voltages when capturing a bright subject, and this is a cause of horizontal line noise. That is, the more drastic the fluctuations in the voltages of the column analog buses become, that is, the brighter the brightness of a subject become, the more drastic the fluctuations in bias voltages become so that horizontal line noise increases.

In respect to these issues, Japanese Patent Laid-Open No. 2006-128704 proposes increasing the driving force of the active transistors MF by increasing their size and electric current, and stabilizing the bias voltages. In this way, horizontal line noise can be decreased according to Japanese Patent Laid-Open No. 2006-128704.

It should be noted that in the technique shown in Japanese Patent Laid-Open No. 2006-128704, the sizes of the load transistors ML(0) to ML(m) are kept the same as conventional sizes. According to Japanese Patent Laid-Open No. 2006-128704, this is to suppress decrease in the dynamic range of the pixels due to increased electric currents of the analog buses.

However, horizontal line noise is sometimes not decreased even when using the technique shown in Japanese Patent Laid-Open No. 2006-128704. For example, even when using the technique shown in Japanese Patent Laid-Open No. 2006-128704, horizontal line noise is still sometimes conspicuous in images obtained by capturing an object at dark times or by capturing extremely dark objects.

Specifically, horizontal line noise sometimes occurs due to a separate generation mechanism that is not described in Japanese Patent Laid-Open No. 2006-128704. As shown in FIG. 2 of Japanese Patent Laid-Open No. 2006-128704, when an interface state is present in a gate insulating film of the active transistors MF, that interface state captures and releases electrons and positive holes that form an electric current Ibias flowing in a channel, and therefore fluctuation (flicker noise) occurs in that electric current Ibias. This fluctuation in the electric current Ibias affects bias voltages that are transmitted from the active transistors MF to the load transistors ML(0) to ML(m). In this way, the gate voltages of the load transistors ML(0) to ML(m) fluctuate, and therefore electric currents Ibias*x that flow to the column analog buses Bus(0) to Bus(m) also fluctuate. In response to this, the values of the reset voltages and data voltages that are read out from the pixels to the column analog buses Bus(0) to Bus(m) fluctuate undesirably. Due to this fluctuation in bias voltages, proper values (substantially zero) are not achieved for image signals, which are a difference between the reset voltages and the data voltages when a subject is captured in a state close to no signal, that is, when capturing an object at a dark time or capturing an extremely dark object, and this is a cause of horizontal line noise.

SUMMARY OF THE INVENTION

The present invention provides for suppressing horizontal line noise in an image obtained by capturing an object at a dark time or by capturing a dark object.

An image sensing device according to a first aspect of the present invention comprising: a pixel array that is arrayed such that pixels that output signals to column signal lines constitute a plurality of rows and a plurality of columns, and in which the plurality of pixels are connected to each of the plurality of column signal lines; a plurality of readout units that read out signals from the pixel array via the plurality of column signal lines, each of the plurality of readout units including an input transistor that receives a signal that has been read out via the column signal line; and a first load transistor that supplies an electric current to the input transistor, and a plurality of first bias supply units that supply mutually different bias voltages to gates of the first load transistors at least in readout units of the plurality of readout units and arranged adjacent to each other.

An image sensing system according to a second aspect of the present invention comprising: the image sensing device according to the first aspect of the present invention; an optical system in which an image is formed on an imaging surface of the image sensing device, and a signal processing unit that processes signals output from the image sensing device to generate image data.

With the present invention, it is possible to suppress horizontal line noise in an image obtained by capturing an object at a dark time or by capturing a dark object.

Further features of the present invention will become apparent from the following description of exemplary embodiments with reference to the attached drawings.

DESCRIPTION OF THE EMBODIMENTS

Figure 1:
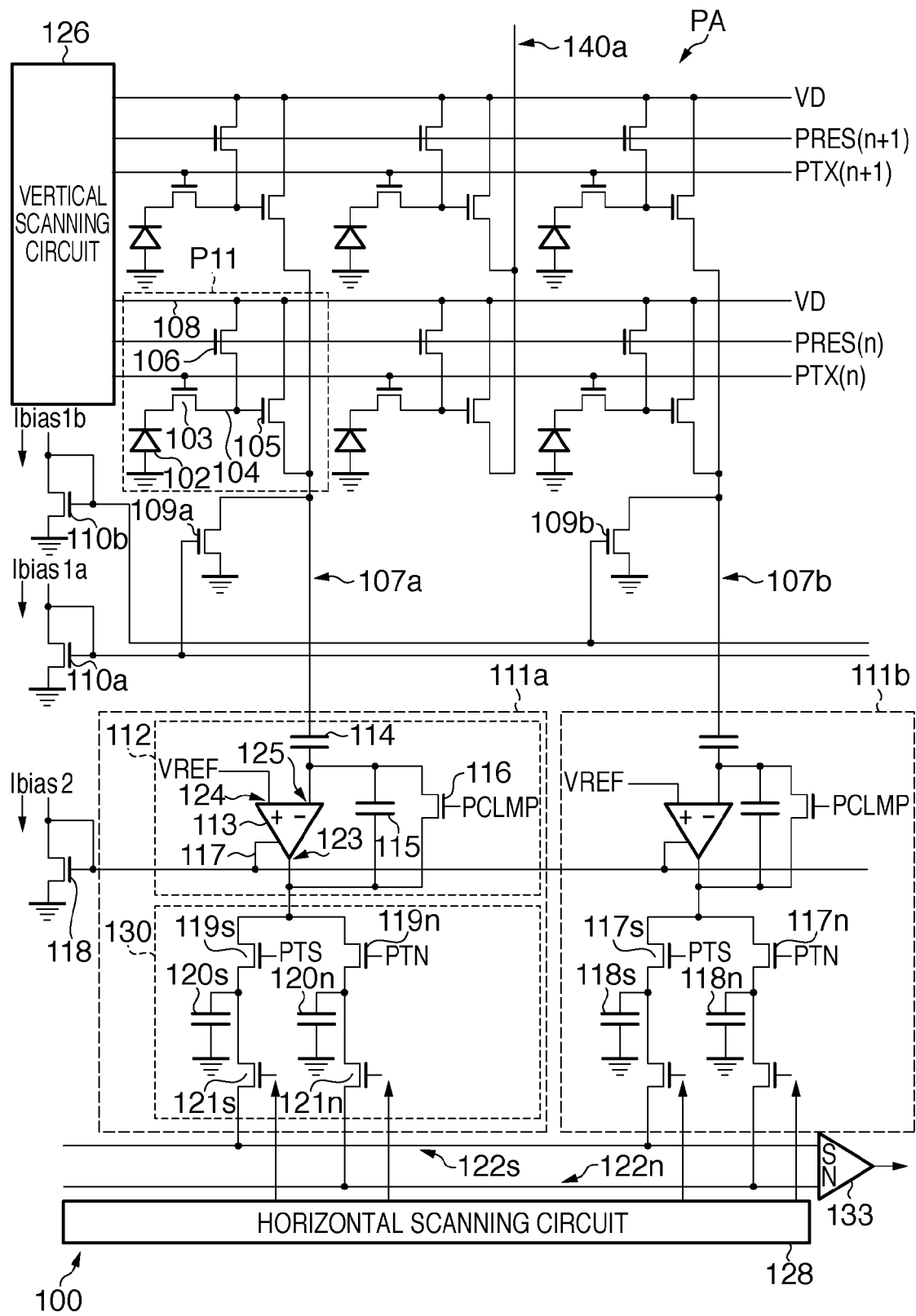
FIG. 1 is a configuration diagram of an image sensing device 100 according to a first embodiment.

The description regarding an image sensing device 100 according to a first embodiment of the present invention is given using FIG. 1.

The image sensing device 100 comprises a pixel array PA, a vertical scanning circuit 126, a plurality of column readout circuits (plurality of readout units) 111a and 111b, a horizontal scanning circuit 128, and a mirror transistor (first bias supply unit) 118. The image sensing device 100 further comprises a plurality of mirror transistors (plurality of second bias supply units) 110a and 110b, and a plurality of load transistors (plurality of second load transistors) 109a and 109b.

Figure 6:
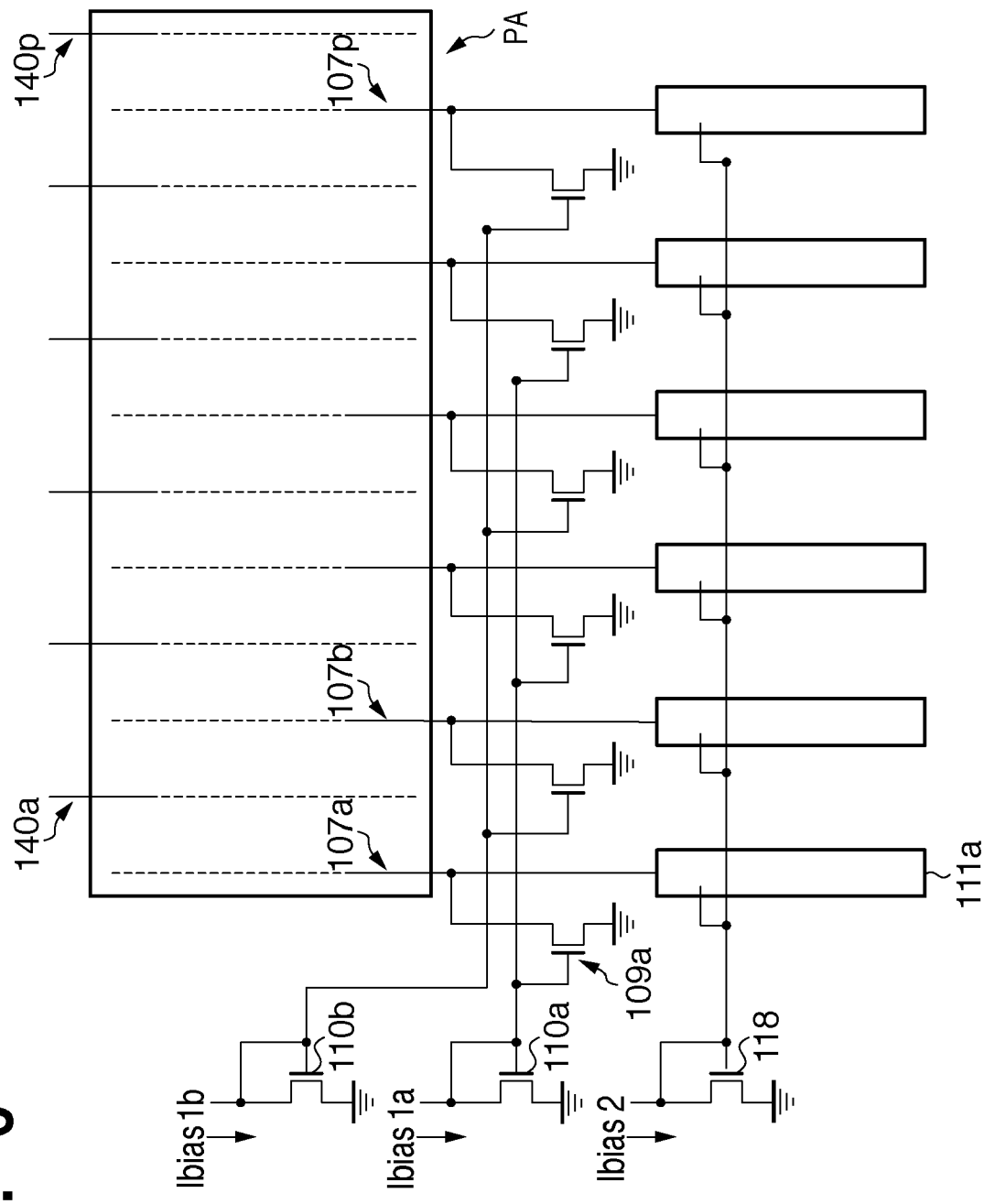
FIG. 6 is a configuration diagram of an image sensing device 100 according to the first embodiment.

In the pixel array PA, pixels are arrayed so as to constitute a plurality of rows and a plurality of columns. In order to simplify description, FIG. 1 illustrates a case where the pixel array PA is constituted by two rows and three columns, but in an actual image sensing device, the number of pixels contained in the pixel array PA is much greater (see FIG. 6). A plurality of column signal lines 107a and 107b, which extend to a lower side (side of one end) of the pixel array PA in FIG. 1, are connected to pixels of odd numbered columns (a portion of the columns) in the pixel array PA. A plurality of pixels are connected to each of the plurality of column signal lines 107a and 107b. A column signal line 140a, which extends to an upper side (side of other end) of the pixel array PA in FIG. 1, is connected to pixels of even numbered columns (a portion of the columns) in the pixel array PA. A plurality of pixels are connected to the column signal line 140a. When the number of columns in the pixel array PA is four or more, a plurality of column signal lines extending to the upper side of the pixel array PA is provided in a same manner as the column signal line 140a (as shown in FIG. 6).

The vertical scanning circuit 126 scans the pixel array PA in a vertical direction (direction along the columns). The vertical scanning circuit 126 selects and drives the pixels of each row by supplying control signals to the pixels of each row via control lines. The control signals include reset signals PRES(n+1) and PRES(n) and transfer signals PTX(n+1) and PTX(n).

Connected to the column signal lines 107a and 107b (107a to 107p shown in FIG. 6), which extend to the lower side of the pixel array PA, are the respectively corresponding load transistors 109a and 109b and the column readout circuits (first readout unit group) 111a and 111b. Similarly, connected to the plurality of column signal lines 140a and so on (140a to 140p shown in FIG. 6), which extend to the upper side of the pixel array PA, are a plurality of load transistors (not shown in drawings) and a plurality of column readout circuits (second readout unit group, not shown in drawings). Furthermore, mirror transistors (not shown in drawings) are connected to the plurality of load transistors and the plurality of column readout circuits respectively.

The plurality of column readout circuits 111a and 111b read out signals from the pixels of columns connected via the column signal lines 107a and 107b respectively. The plurality of column readout circuits 111a and 111b correspond to the plurality of odd numbered columns (first column and third column) in the pixel array PA.

The horizontal scanning circuit 128 scans the plurality of column readout circuits 111a and 111b in a horizontal direction. The horizontal scanning circuit 128 successively selects the column readout circuits 111a and 111b of each of the odd numbered columns and successively transfers the signals (S signal and N signal) read out from the pixels of each of the odd numbered columns to an output amplifier 133. The output amplifier 133 generates and outputs image signals by carrying out a CDS process in which a difference between the S signal and the N signal is obtained.

The mirror transistor 118 is short-circuited between the gate and the drain. The gate of the mirror transistor 118 is connected to the plurality of column readout circuits 111a and 111b.

Each of the plurality of mirror transistors 110a and 110b is short-circuited between the gate and the drain. The plurality of mirror transistors 110a and 110b supply a bias voltage to the load transistors 109a and 109b. In FIG. 1, one load transistor 109a is connected to the mirror transistor 110a, but when the present embodiment is applied to a pixel array having a much greater number of columns, a plurality of load transistors may be connected to a single mirror transistor. However, note that at least load transistors arranged adjacent to each other are connected to different mirror transistors. The plurality of load transistors 109a and 109b are connected to each of the plurality of column signal lines 107a and 107b and determine the electric current that flows to the column signal lines 107a and 107b. For example, the drains of the plurality of load transistors 109a and 109b are connected to the column signal lines 107a and 107b respectively and their sources are connected to a ground electric potential.

The mirror transistor 110a and the load transistor 109a form a current mirror circuit. In this way, the load transistor 109a enables an electric current corresponding to a drain electric current Ibias1a of the mirror transistor 110a to flow in the column signal line 107a. Furthermore, the mirror transistor 110b and the load transistor 109b form a current mirror circuit. In this way, the load transistor 109b enables a drain electric current corresponding to a drain electric current Ibias1b of the mirror transistor 110b to flow to the column signal line 107b.

Here, the gate of the mirror transistor 110a is connected to the gate of the load transistor 109a that is connected to the column signal line 107a. And the gate of the mirror transistor 110b is connected to the gate of the load transistor 109b that is connected to the column signal line 107b. That is, the gates of at least the load transistors 109a and 109b arranged adjacent to each other of the plurality of load transistors 109a and 109b are connected to the gates of mutually different mirror transistors of the plurality of mirror transistors 110a and 110b. In this way, the plurality of mirror transistors 110a and 110b supply mutually different bias voltages to the gates of at least load transistors arranged adjacent to each other of the plurality of load transistors 109a and 109b. For this reason, the electric currents determined by the load transistors 109a and 109b arranged adjacent to each other can suppress fluctuation in a similar manner. As a result, even if an effect of electric current fluctuation as described above (or bias voltage fluctuation) appears in an image corresponding to image signals output via the column signal lines 107a and 107b, it is possible to ensure that the effect of the electric current fluctuation in that image is not conspicuous. That is, it is possible to suppress horizontal line noise in an image obtained by capturing an object at a dark time or by capturing a dark object.

The description of a configuration of each pixel in the pixel array PA is given using FIG. 1. Hereinafter, the configuration of a pixel P11 is described as an example, but the configurations of other pixels are equivalent to the configuration of the pixel P11.

The pixel P11 includes a photoelectric conversion unit 102, a transfer unit 103, a charge-voltage converter 104, an amplification transistor 105, and a reset unit 106.

The photoelectric conversion unit 102 generates an electric charge corresponding to light. The photoelectric conversion unit 102 is, for example, a photodiode.

The transfer unit 103 transfers the electric charge generated by the photoelectric conversion unit 102 to the charge-voltage converter 104. The transfer unit 103 is, for example, a transfer transistor and it turns on when an active transfer signal PTX(n) is supplied to its gate such that the electric charge generated by the photoelectric conversion unit 102 is transferred to the charge-voltage converter 104.

The charge-voltage converter 104 converts the transferred electric charge to a voltage. The charge-voltage converter 104 also functions as an input unit of the amplification transistor 105. The charge-voltage converter 104 is, for example, a floating diffusion region.

By working as a source follower together with the load transistor 109a, the amplification transistor 105 (amplifies and) outputs a signal corresponding to the voltage of the charge-voltage converter 104 to the column signal line 107a. A power voltage VD is supplied to the drain of the amplification transistor 105 via a power supply line 108.

The reset unit 106 resets the charge-voltage converter 104. The reset unit 106 is, for example, a reset transistor and it turns on when an active reset signal PRES(n) is supplied to its gate so as to reset the charge-voltage converter 104. A power voltage VD is supplied to the drain of the reset unit (reset transistor) 106 via the power supply line 108.

The description of a configuration of the column readout circuits 111a and 111b is given using FIG. 1. Hereinafter, the configuration of the column readout circuit 111a is described as an example, but the configurations of other column readout circuits are equivalent to the configuration of the column readout circuit 111a.

The column readout circuit 111a includes a column amplifier circuit (amplifier circuit) 112 and a holding circuit 130.

The column amplification circuit 112 includes a column amplifier 113, an input capacitor 114, a feedback capacitor 115, a clamp control switch 116, and a bias input terminal 117. A reference signal VREF is input to a non-inverting input terminal 124 of the column amplifier 113, and the input capacitor 114 is connected to an inverting input terminal 125 thereof. Furthermore, the feedback capacitor 115 and the clamp control switch 116 are connected in parallel to the inverting input terminal 125 and an output terminal 123 of the column amplifier 113. The gate of the mirror transistor 118 is connected to the bias input terminal 117 of the column amplifier 113.

The holding circuit 130 includes transfer switches 119n and 119s, storage capacitors 120n and 120s, and transfer switches 121n and 121s. By turning on/off the transfer switch 119n, the output terminal 123 of the column amplifier 113 and the storage capacitor 120n are connected/disconnected. By turning on/off the transfer switch 119s, the output terminal 123 of the column amplifier 113 and the storage capacitor 120s are connected/disconnected. By turning on/off the transfer switch 121n, the storage capacitor 120n and an output line 122n are connected/disconnected. By turning on/off the transfer switch 121s, the storage capacitor 120s and an output line 122s are connected/disconnected.

Figure 3:
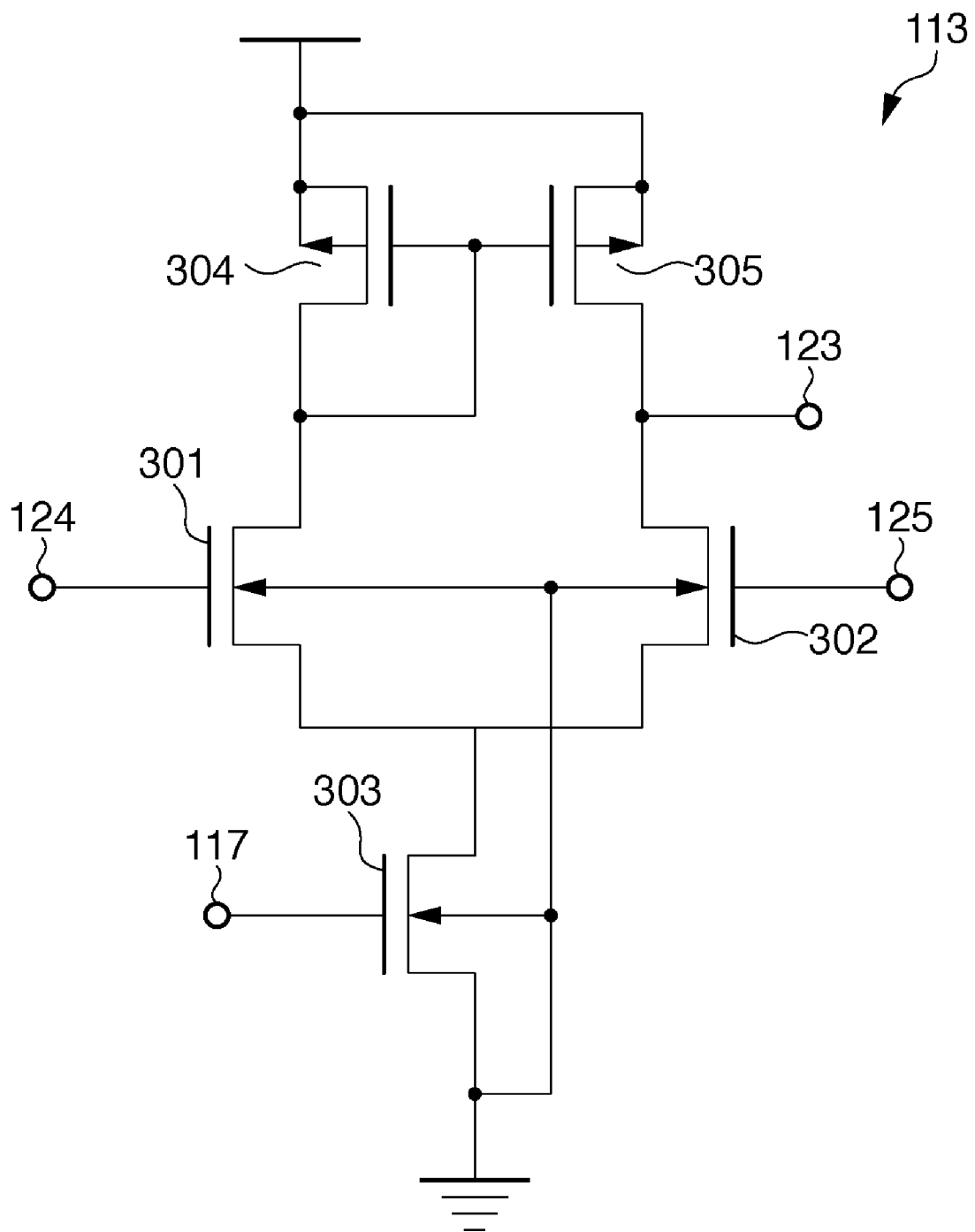
FIG. 3 is a configuration diagram of a column amplifier 113.

The description of a configuration of the column amplifier 113 is given using FIG. 3. FIG. 3 is a configuration diagram of the column amplifier 113. Hereinafter, the configuration of the column amplifier 113 contained in the column readout circuit 111a is described as an example, but the configurations of other column amplifiers contained in the column readout circuits are equivalent to the configuration of the column amplifier 113 contained in the column readout circuit 111a.

The column amplifier 113 is, for example, a differential amplifier circuit in which N-channel type MOS transistors are used as input transistors. The column amplifier 113 includes input transistors 301 and 302, a load transistor 303, and transistors 304 and 305.

The input transistor 301 is an N-channel type MOS transistor, and its gate is connected to a non-inverting input terminal 124 (see FIG. 1). The input transistor 302 receives a reference signal VREF. The input transistor 302 is an N-channel type MOS transistor, and its gate is connected to an inverting input terminal 125 (see FIG. 1) and its drain is connected to the output terminal 123 (see FIG. 1). The input transistor 302 receives signals that have been read out via the column signal line 107a.

The gate of the load transistor 303 is connected to the bias input terminal 117 (see FIG. 1). The load transistor 303 determines the electric current that flows through the input transistors 301 and 302 corresponding to the bias voltage supplied to its gate via the bias input terminal 117. The load transistor 303 enables an electric current corresponding to a drain electric current Ibias2 of the mirror transistor 118 to flow through the input transistors 301 and 302.

Here, the back-gates of the input transistors 301 and 302 and the load transistor 303 are connected to a GND electric potential via common wiring.

A transistor 304 is a P-channel type MOS transistor, and is short-circuited between its gate and drain. A transistor 305 is a P-channel type MOS transistor. The transistor 304 and the transistor 305 form a current mirror circuit. The back-gates of the transistor 304 and 305 are connected to a power source VDD.

Figure 2:
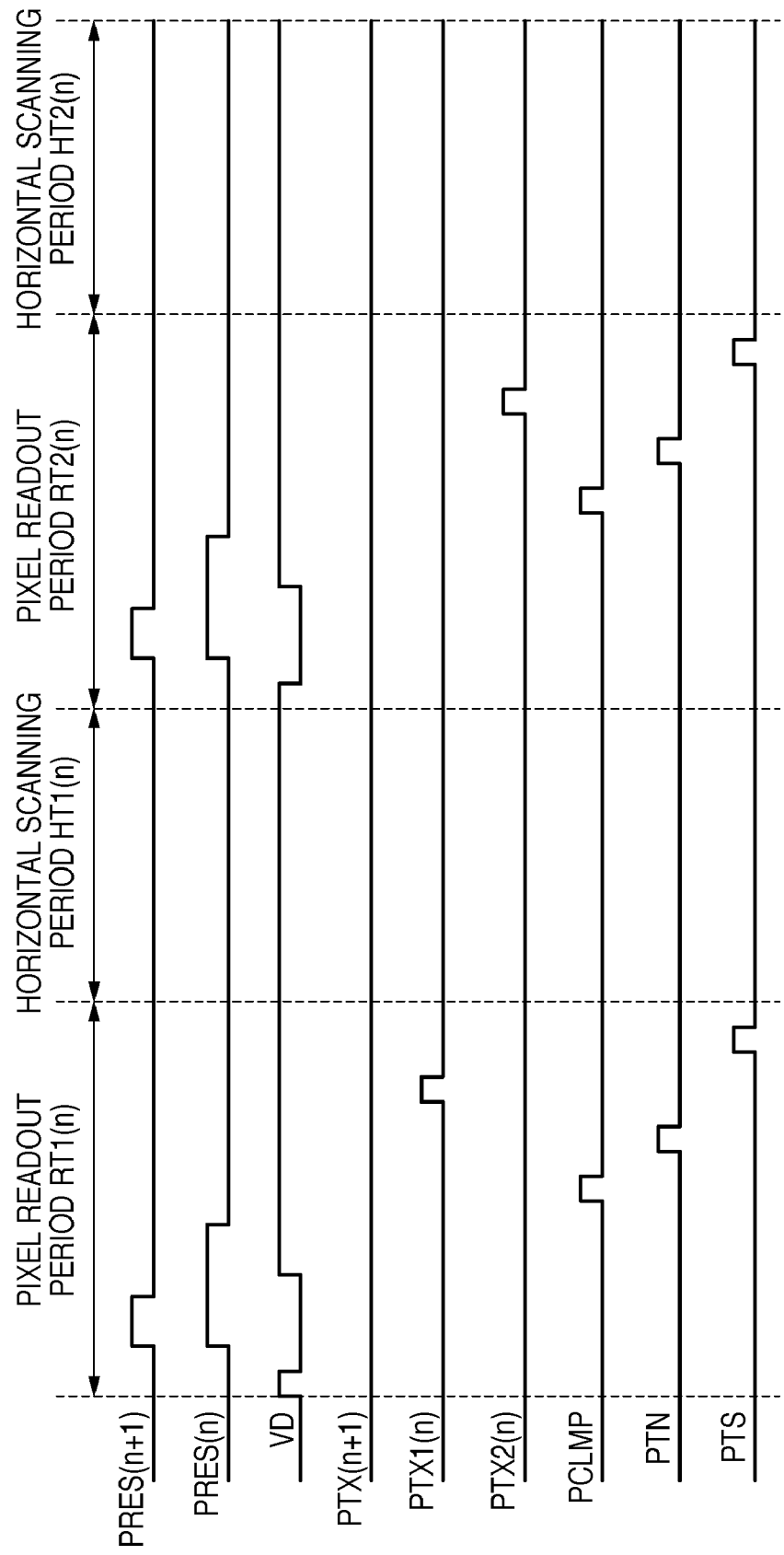
FIG. 2 is a timing chart showing an operation of the image sensing device 100.

The description of an operation of the image sensing device 100 is given using FIG. 2. FIG. 2 is a timing chart showing an operation of the image sensing device 100. Hereinafter, although the description is centered on an operation relating to pixels of odd numbered columns in the pixel array PA, an operation relating to pixels of even numbered columns is also the similar.

Row selection operations in the image sensing device 100 according to the present embodiment are carried out by controlling a gate electric potential of the amplification transistor 105 of FIG. 1. For example, row selection operations are carried out by lowering the gate electric potential of the amplification transistor 105 of non-selected rows and raising the gate electric potential of the amplification transistor 105 of selected rows.

The column signal line 107a serves as an output node of a source follower circuit formed by the amplification transistor 105 and the load transistor 109a of the selected rows. The gate of the load transistor 109a is connected to the gate and the drain of the mirror transistor 110a, and an electric current in accordance with the electric current Ibias1a that flows through the mirror transistor 110a flows in the column signal line 107a.

The column signal line 107b serves as an output node of a source follower circuit formed by the amplification transistors 105 of the selected rows and the load transistor 109b. The gate of the load transistor 109b is connected to the gate and the drain of the mirror transistor 110b, and an electric current in accordance with the electric current Ibias1*b* that flows through the mirror transistor 110*b* flows in the column signal line 107*b*.

The amplification transistor 105 of the selected rows is activated and the amplification transistors 105 of the non-selected rows is deactivated, and therefore the column signal lines 107*a* and 107*b* are given an electric potential in accordance with the electric potential of the charge-voltage converter 104 of the selected rows.

In a first part of a pixel readout period RT1(*n*) shown in FIG. 2, the reset signal PRES(n) and PRES(n+1) of all the rows are high due to control of the vertical scanning circuit 126. At this time, the charge-voltage converters 104 of all pixels are reset to a low level via the power supply line 108 and the reset unit (reset transistor) 106 of each of the pixels P11. An electric potential level VD of the power supply line 108 at this time is in low level.

In a second part of the pixel readout period RT1(*n*), the reset signal PRES(n+1) of rows excluding the selected row (n-th row) becomes low level. After this, the electric potential level VD of the power supply line 108 becomes high level, and then the charge-voltage converters 104 of the selected row are reset to a high level. Further still, the reset signal PRES(n) becomes low level. At this time, a noise signal corresponding to a state in which the charge-voltage converter 104 has been reset is read out to the column signal line 107*a*.

While the noise signal corresponding to a state in which the charge-voltage converter 104 has been reset is read out to the column signal line 107*a*, a signal PCLMP becomes high level. In this way, the inverting input terminal 125 and the output terminal 123 of the column amplifier 113 are short-circuited, and the output terminal 123 is clamped at the VREF electric potential. The output signal of the column amplifier 113 at this time is read out to the storage capacitor 120*n* via the transfer switch 119*n* by setting the signal PTN to high level. The output signal that is read out at this point is handled as an N signal. The N signal is a signal in which the offset of the column amplifier 113 is included. After this, the transfer unit (transfer transistor) 103 is turned on for a predetermined period by a transfer pulse PTX(n) (e.g. PTX(1)), and the charge-voltage converter 104 converts the transferred charge to a voltage. The amplification transistor 105 outputs a signal (optical signal) corresponding to the voltage of the charge-voltage converter 104 to the column signal line 107. At this time, the signal PCLMP is low, and a signal which is obtained by reducing, from the optical signal, the noise signal component corresponding to the state in which the charge-voltage converter 104 has been reset, is input to the column amplifier 113. The column amplifier 113 generates an S signal in which a voltage component, to which an inverse gain has been applied with respect to the noise-reduced optical signal, is superimposed on the N signal (offset of the column amp). Following this, the signal PTS becomes high, and the S signal corresponding to the optical signal is read out to the storage capacitor 120*s* via the transfer switch 119*s*.

A horizontal transfer operation is carried out in a horizontal scanning period HT1(*n*). That is, the N signals and S signals of columns selected by the horizontal scanning circuit 128 are transferred sequentially from the column readout circuits 111*a* and 111*b* of each column to the output lines 122*n* and 122*s*. The output amplifier 133 generates and outputs an image signal of a pixel on the n-th row, in which the offset of the column amplifier has been removed, by carrying out CDS processing in which a difference between the transferred N signal and S signal is obtained.

By sequentially scanning the rows selected by the vertical scanning circuit 126 and repeating the above-described pixel readout operation, image signals of all the pixels in the pixel array PA are generated and output.

As described above, in the present embodiment, two mirror transistors 110*a* and 110*b* are provided. The two mirror transistors are alternately connected to the load transistors connected to the pixel output lines that are read out on an upper side (or lower side). There is different fluctuation in electric current due to the flicker noise that occurs in the mirror transistors 110*a* and 110*b*. In this way, the effect of electric current fluctuation (bias voltage fluctuation) of the mirror transistors 110*a* and 110*b* can be caused to vary between signals transmitted by column signal lines that are adjacent to each other. That is, the signals of pixels adjacent to each other in odd numbered columns (or even numbered columns) have different fluctuation effects and horizontal line noise is greatly reduced. As a result, horizontal line noise when capturing an object at a dark time or capturing extremely dark objects is greatly reduced and it becomes possible to obtain an excellent image. Furthermore, by applying the present invention to a single-panel color image sensing device, even higher quality image capturing can be carried out.

It should be noted that an example was shown in which the two mirror transistors 110*a* and 110*b* were provided, but a greater effect can be obtained by providing a greater number of mirror transistors. However, there is a tradeoff with, for example, the increase of power consumption by increasing the number of Ibias1*a* and Ibias1*b*, or the increase of the chip size along with the complexity of layouts.

Figure 4:
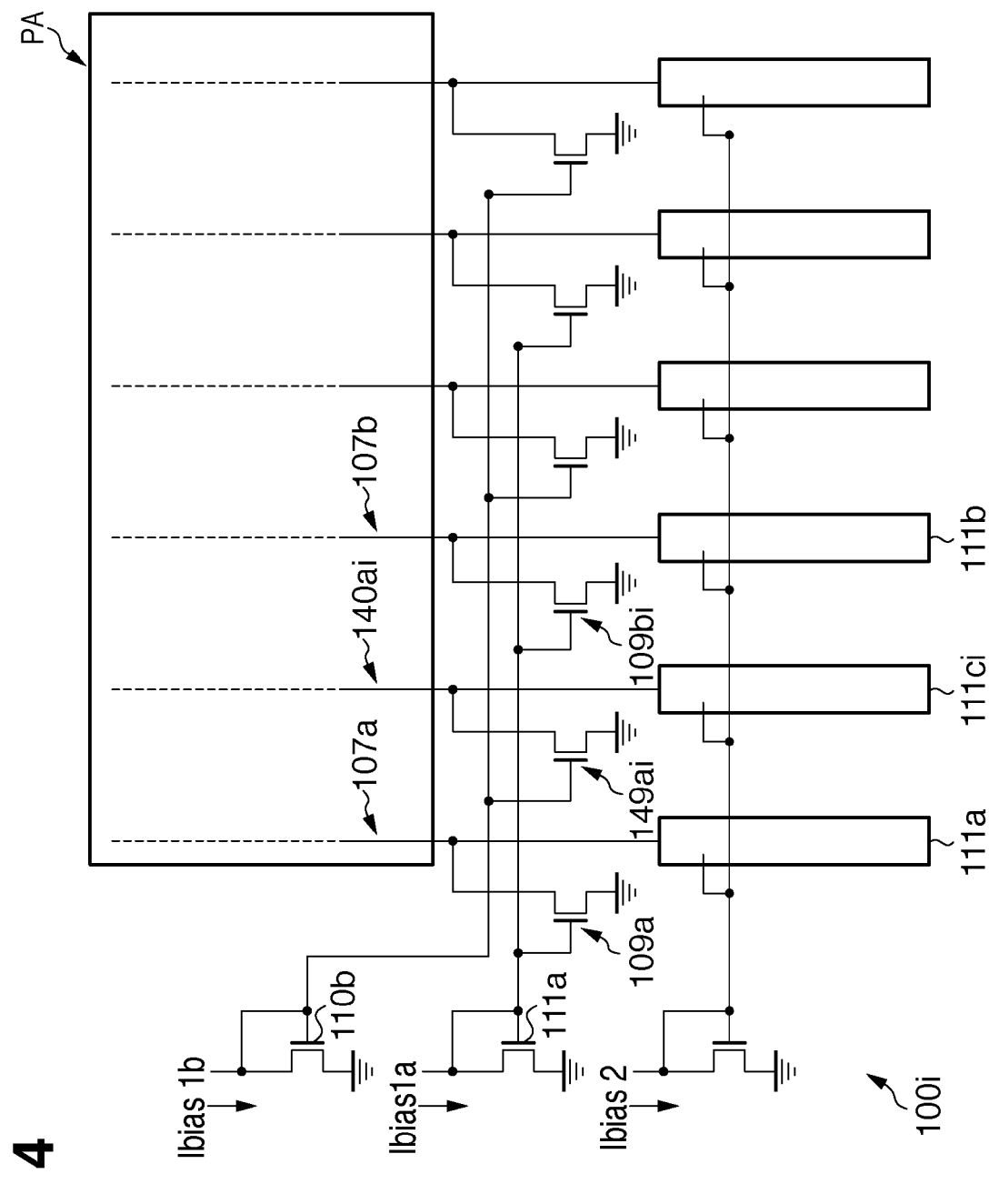
FIG. 4 is a configuration diagram of an image sensing device 100i according to a modified example of the first embodiment.

Furthermore, in an image sensing device 110*i*, the column signal lines may extend to only one side with respect to the pixel array PA as shown in FIG. 4. In this case, a gate of a load transistor 149*ai*, which is connected to a column signal line 140*ai* connected to pixels of even numbered columns, is connected to a gate of the mirror transistor 110*b*. Furthermore, gates of the load transistors 109*a* and 109*bi*, which are connected to the column signal lines 107*a* and 107*b* connected to pixels of odd numbered columns, are connected to a gate of the mirror transistor 111*a*.

Figure 5:
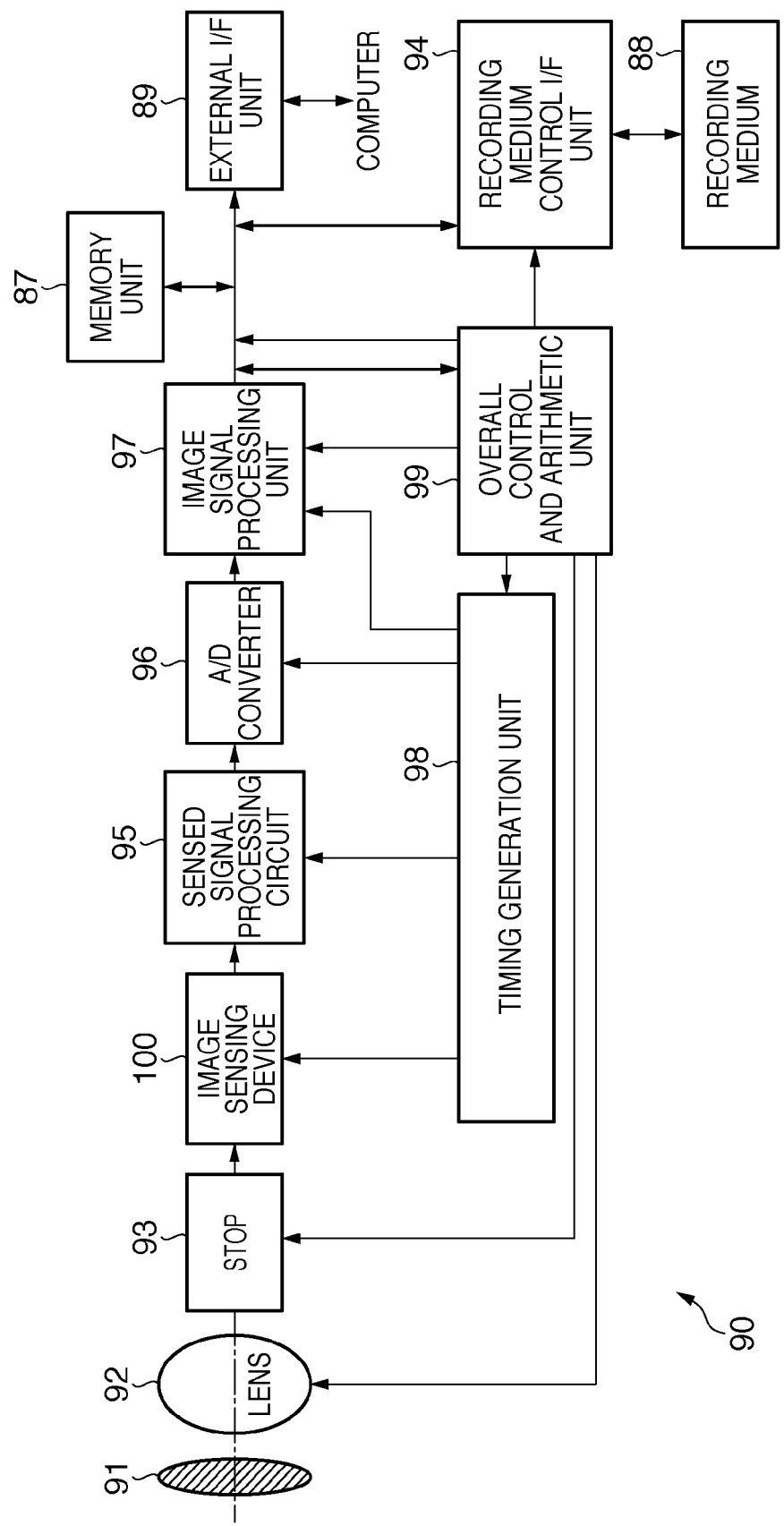
FIG. 5 is a configuration diagram of an image sensing system in which a photoelectric conversion device according to the first embodiment is applied.

FIG. 5 shows an example of an image sensing system in which an image sensing device according to the present invention has been applied.

As shown in FIG. 5, an image sensing system 90 mainly comprises an optical system, the image sensing device 100, and a signal processing unit. The optical system mainly comprises a shutter 91, a lens 92, and a stop 93. The signal processing unit mainly comprises an sensed signal processing circuit 95, an A/D converter 96, an image signal processing unit 97, a memory unit 87, an external I/F unit 89, a timing generation unit 98, an overall control and arithmetic unit 99, a recording medium 88, and a recording medium control I/F unit 94. It should be noted that the signal processing unit does not necessarily comprise the recording medium 88.

The shutter 91 is arranged on an optical path in front of the lens 92 and controls the exposure.

The lens 92 refracts light that has entered to form an image of an object on the pixel array (imaging surface) of the image sensing device 100.

The stop 93 is arranged on the optical path between the lens 92 and the image sensing device 100, and adjusts an amount of light that is guided to the image sensing device 100 after passing through the lens 92.

The image sensing device 100 converts the image of the object formed on the pixel array to image signals. The image sensing device 100 reads out the image signals from the pixel array and outputs the image signals.

The sensed signal processing circuit 95 is connected to the image sensing device 100 and processes the image signals that are output from the image sensing device 100.

The A/D converter 96 is connected to the sensed signal processing circuit 95, and converts the image signals (analog signals) that have been output after processing from the sensed signal processing circuit 95 to digital signals.

The image signal processing unit 97 is connected to the A/D converter 96, and carries out arithmetic processing such as various kinds of corrections on the image signals (digital signals) output from the A/D converter 96 to generate image data. This image data is supplied to the memory unit 87, the external I/F unit 89, the overall control and arithmetic unit 99, the recording medium control I/F unit 94, and the like.

The memory unit 87 is connected to the image signal processing unit 97, and stores image data that has been output from the image signal processing unit 97.

The external I/F unit 89 is connected to the image signal processing unit 97. In this way, image data that has been output from the image signal processing unit 97 is transferred to external devices (personal computers and the like) via the external I/F unit 89.

The timing generation unit 98 is connected to the image sensing device 100, the sensed signal processing circuit 95, the A/D converter 96, and the image signal processing unit 97. In this way, timing signals are supplied to the image sensing device 100, the sensed signal processing circuit 95, the A/D converter 96, and the image signal processing unit 97. And the image sensing device 100, the sensed signal processing circuit 95, the A/D converter 96, and the image signal processing unit 97 operate in synchronization with the timing signals.

The overall control and arithmetic unit 99 is connected to the timing generation unit 98, the image signal processing unit 97, and the recording medium control I/F unit 94, and performs overall control of the timing generation unit 98, the image signal processing unit 97, and the recording medium control I/F unit 94.

The recording medium 88 is detachably connected to the recording medium control I/F unit 94. In this way, image data that has been output from the image signal processing unit 97 is recorded to the recording medium 88 via the recording medium control I/F unit 94.

With this configuration, excellent images (image data) can be obtained if excellent image signals can be obtained by the image sensing device 100.

Figure 7:
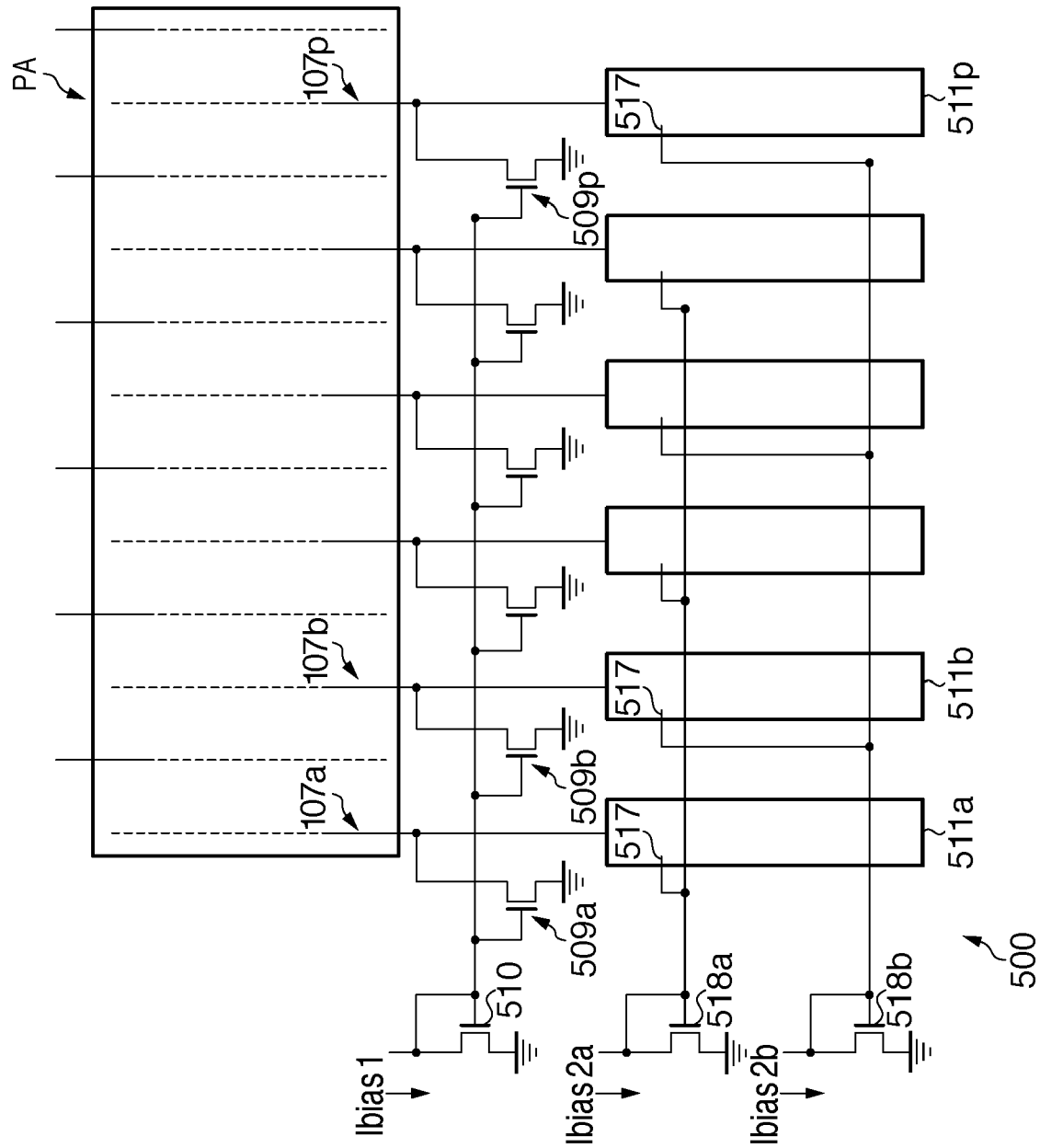
FIG. 7 is a configuration diagram of an image sensing device 500 according to a second embodiment.

The description regarding an image sensing device 500 according to a second embodiment of the present invention is given using FIG. 7. FIG. 7 is a configuration diagram of the image sensing device 500 according to the second embodiment of the present invention.

Although the fundamental configuration of the image sensing device 500 is similar to the first embodiment, the image sensing device 500 is different from that of the first embodiment in the following points. The image sensing device 500 comprises a plurality of load transistors 509a to 509p, a plurality of column readout circuits 511a to 511p, a mirror transistor 510, and a plurality of mirror transistors 518a and 518b.

Each of the gates of the load transistors 509a to 509p is connected to the gate of the mirror transistor 510.

The two mirror transistors 518a and 518b are alternately connected to the column readout circuits 511a to 511p connected to the column signal lines 107a to 107p extending to a lower side of the pixel array PA. That is, the gates (bias input terminals 517) of the load transistors 303 inside at least the column readout circuits arranged adjacent to each other in the plurality of column readout circuits 511a to 511p are connected to the gates of mutually different mirror transistors. For example, the load transistor 303 (see FIG. 3) of the column readout circuit 511a determines an electric current corresponding to a drain electric current Ibias2a of the mirror transistor 518a that is to flow through the input transistors 301 and 302. Furthermore, for example, the load transistor 303 of the column readout circuit 511b determines an electric current corresponding to a drain electric current Ibias2b of the mirror transistor 518b that is to flow through the input transistors 301 and 302 (see FIG. 3). In this way, the electric currents determined by the load transistors 303 arranged adjacent to each other can suppress fluctuation in a similar manner. As a result, even if an effect of electric current fluctuation appears in an image corresponding to image signals output via the column signal lines 107a and 107b, it is possible to ensure that the effect of the electric current fluctuation in that image is not conspicuous. In other words, it is possible to suppress horizontal line noise in an image obtained by capturing an object at a dark time or by capturing a dark object.

It should be noted that the second embodiment can achieve a large effect when noises originating in the mirror transistors connected to the column readout circuits 511a to 511p is larger than noises originating in the mirror transistors connected to the load transistors 509a to 509p.

Figure 8:
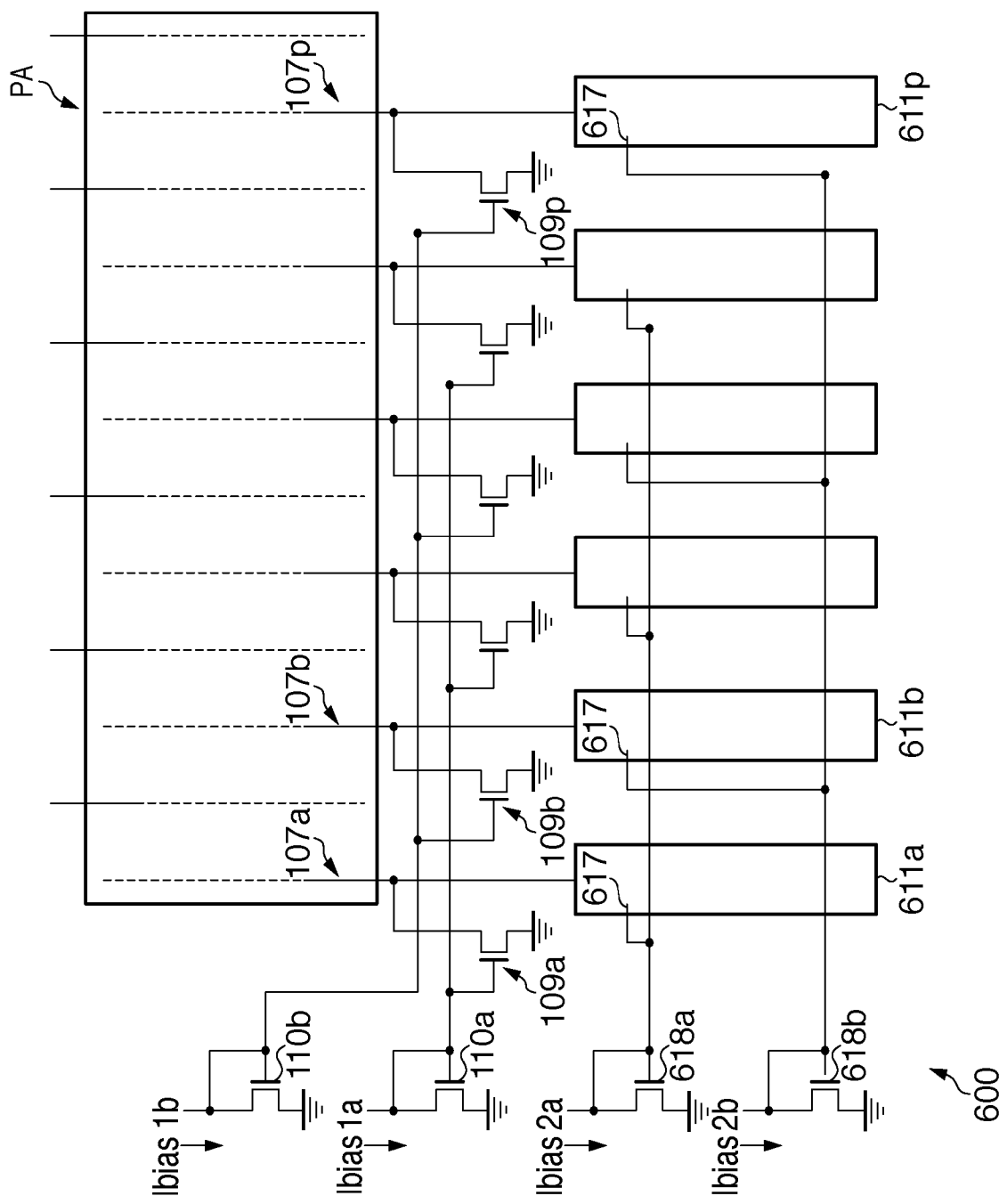
FIG. 8 is a configuration diagram of an image sensing device 600 according to a third embodiment.

The description regarding an image sensing device 600 according to a third embodiment of the present invention is given using FIG. 8. FIG. 8 is a configuration diagram of the image sensing device 600 according to the third embodiment of the present invention.

Although the fundamental configuration of the image sensing device 600 is similar to the first embodiment, the image sensing device 600 is different from that of the first embodiment in the following points. The image sensing device 600 comprises a plurality of column readout circuits 611a to 611p and a plurality of mirror transistors (a plurality of first bias supply units) 618a and 618b.

Each of the plurality of column readout circuits 611a to 611p includes a load transistor (first load transistor) 303. The two mirror transistors 618a and 618b are alternately connected to the column readout circuits 611a to 611p respectively connected to the column signal lines 107a to 107p extending to a lower side of the pixel array PA. That is, the gates (bias input terminals 617) of at least the load transistors 303 arranged adjacent to each other of the plurality of load transistors 303 are connected to the gates of mutually different mirror transistors of the plurality of mirror transistors 618a and 618b. In this way, it is possible to suppress fluctuating of the electric currents determined by the load transistors 303 inside the column readout circuits arranged adjacent to each other in a similar manner. As a result, even if an effect of electric current fluctuation appears in an image corresponding to image signals output via the column signal lines 107a and 107b, it is possible to make less conspicuous the effect of the electric current fluctuation in an image. In other words, it is possible to suppress horizontal line noise in an image obtained by capturing an object at a dark time or by capturing a dark object.

It should be noted that the third embodiment can achieve a large effect when noises originating in the mirror transistors connected to the load transistors 109a to 109p and noises originating in the mirror transistors connected to the column readout circuits 611a to 611p are equivalent.

Figure 9:
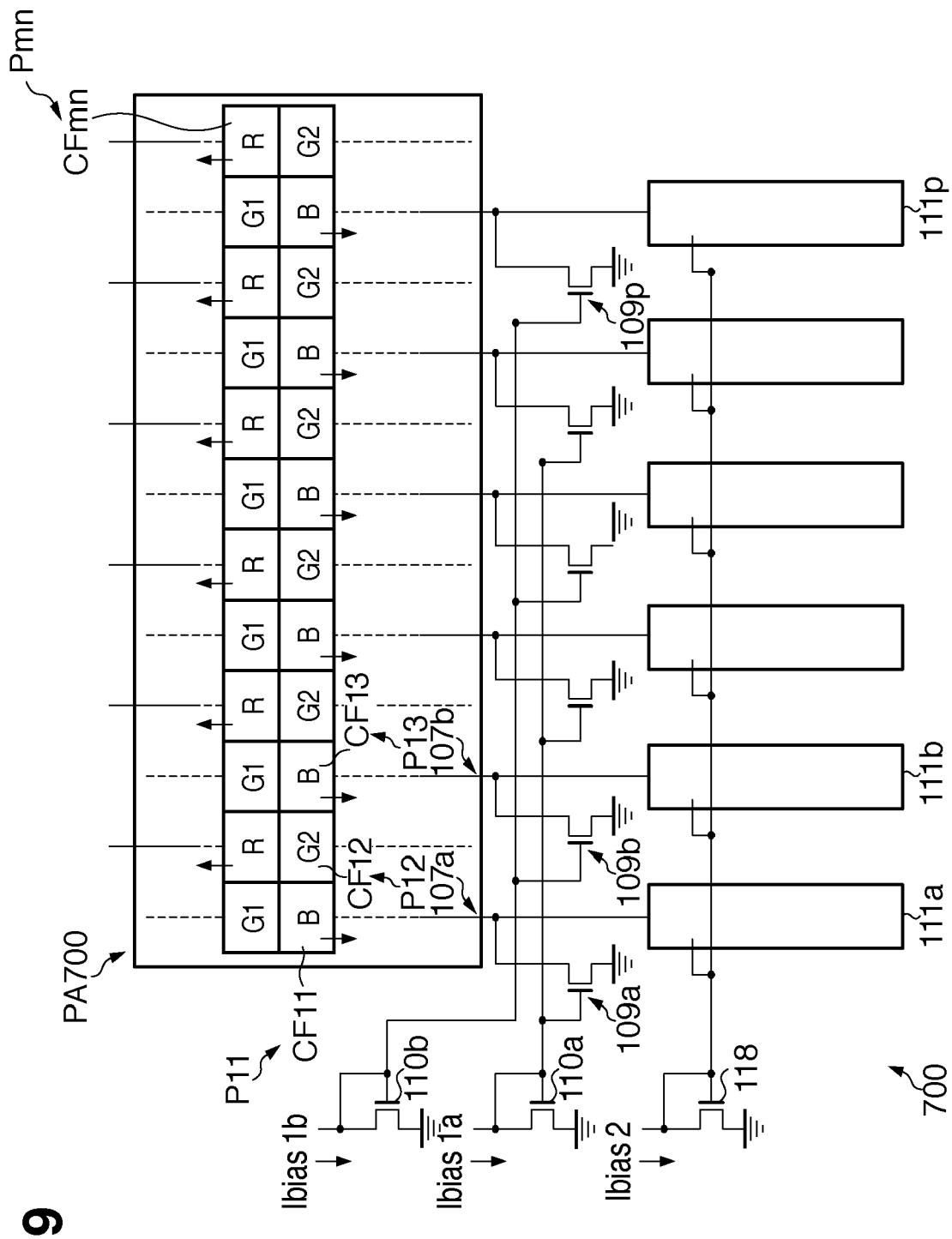
FIG. 9 is a configuration diagram of an image sensing device 700 according to a fourth embodiment.

The description regarding an image sensing device 700 according to a fourth embodiment of the present invention is given using FIG. 9. FIG. 9 is a configuration diagram of the image sensing device 700 according to the fourth embodiment of the present invention.

Although the fundamental configuration of the image sensing device 700 is similar to the first embodiment, the image sensing device 700 is different from that of the first embodiment in the following points. The image sensing device 700 is a single-chip color image sensing device commonly used in digital cameras and the like. The image sensing device 700 comprises a pixel array PA700.

A plurality of pixels P11 to Pmn in the pixel array PA700 further include color filters CF11 to CFmn respectively. The color filters CF11 to CFmn transmit light of some wavelength in a visible region so that light of that wavelength enters into the photoelectric conversion unit 102.

In the image signals output from the image sensing device 700, an image signal of each pixel has information regarding only one type of color. Accordingly, as described in an example of Japanese Patent Laid-Open No. 2000-287219, a color image in which all the colors (for example, RGB) of all the pixels are available can be generated by performing interpolation on image data corresponding to image signals output from the image sensing device using information (image data) of nearby pixels. In single-chip color image sensing devices, it is known that the effect of horizontal line noise is accentuated since a certain pixel contains information of nearby pixels.

For example, consider a case such as that shown in FIG. 9 in which an array of the color filters CF11 to CFmn is formed in a Bayer arrangement. In reading out a row of B pixels and G2 pixels, the B pixels are read out to the lower side and the G2 pixels are read out to the upper side. In this case, the flicker noise generated in the lower side mirror transistors affects all the B pixel signals and the upper side affects all the G2 pixel signals. Consequently, although horizontal line noise affects every other pixel, by performing interpolation processing using the information of nearby pixels are described above, there is a possiblity that the horizontal line noise component of the B pixels for example can be accentuated in the G2 pixels also.

Even in this case, according to the present embodiment, the color filters in the plurality of pixels in which signals are read out in a same period by column readout circuits among the plurality of column readout circuits 111a to 111p and arranged adjacent to each other transmit light of a same wavelength range (same color). For example, a color filter CF11 of the pixel P11 and a color filter CF13 of the pixel P13 transmit light of a wavelength corresponding to the same color (B). And the gates of at least the load transistors 109a and 109b arranged adjacent to each other in the plurality of load transistors 109a and 109b are connected to the gates of mutually different mirror transistors of the plurality of mirror transistors 110a and 110b. In this way, it is possible to suppress fluctuation of the electric currents determined by the load transistors 109a and 109b arranged adjacent to each other in a similar manner. As a result, the effects of electric current fluctuation may vary between the B pixels P11 and P13 to the left and right of the G2 pixel P12 for example, and therefore the horizontal line noise in the G2 pixel P12 can be reduced by performing interpolation processing using information of nearby pixels. As a result, even when interpolation processing is carried out using information of nearby pixels, it is possible to suppress horizontal line noise in an image obtained by capturing an object at a dark time or by capturing a dark object. Accordingly, it is possible to improve image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-148326, filed Jun. 5, 2008, which is hereby incorporated by reference herein in its entirety.

What is claimed is:

1. An image sensing device comprising:
a pixel array having a plurality of pixels which form rows and columns, wherein each pixel is connected to one of a plurality of column signal lines;
a plurality of readout units that read out signals from the pixel array via the plurality of column signal lines, each of the plurality of readout units including an input transistor that receives a signal on the column signal line, and a first load transistor that supplies an electric current to the input transistor; and
a plurality of first bias supply units that supply bias voltages to gates of the first load transistors of the plurality of readout units, wherein the first load transistors of the readout units that are arranged adjacent to each other are each connected to different first bias supply units of the plurality of first bias supply units.

2. The image sensing device according to claim 1, wherein a first load transistor of a readout unit of the plurality of readout units and a first bias supply unit that are mutually connected form a current mirror circuit.

3. The image sensing device according to claim 1, further comprising:
a plurality of second load transistors that are connected to the plurality of column signal lines, respectively, and that determine an electric current that flows in the plurality of column signal lines, respectively; and
a plurality of second bias supply units that supply bias voltages to gates of the plurality of second load transistors, wherein the second load transistors that are arranged adjacent to each other are each connected to different second bias supply units of the plurality of second bias supply units.

4. The image sensing device according to claim 3, wherein a second load transistor of the plurality of second load transistors and a second bias supply unit that are mutually connected form a current mirror circuit.

5. The image sensing device according to claim 1, wherein the plurality of readout units includes
a first readout unit group that is arranged on a side of one end of the pixel array, and that reads out signals from pixels of a part of the columns in the pixel array via a part of the column signal lines in the plurality of column signal lines, and
a second readout unit group that is arranged on a side of the other end of the pixel array, and that reads out signals from pixels of another part of the columns via another part of the column signal lines, the other part of the columns excluding the part of columns in the pixel array read out via the part of column signal lines, and
wherein each pixel in the pixel array includes
a photoelectric conversion unit, and
a color filter through which light of a wavelength in a visible range is transmitted so that light of the wavelength enters the photoelectric conversion unit, and
wherein color filters in pixels in which signals are read out in a same period by at least first readout units of the first readout unit group and arranged adjacent to each other transmit light of a same wavelength region.

6. An image sensing system comprising:
an image sensing device according to claim 1;
an optical system in which an image is formed on an imaging surface of the image sensing device; and
a signal processing unit that processes signals output from the image sensing device to generate image data.

* * * * *